United States Patent
Lee et al.

(10) Patent No.: US 9,448,665 B2
(45) Date of Patent: Sep. 20, 2016

(54) DISPLAY DEVICE INCLUDING OPTICAL SENSOR

(71) Applicant: Samsung Display Co., Ltd., Yongin, Gyeonggi-Do (KR)

(72) Inventors: Sang-Je Lee, Asan-si (KR); Bong Hyun You, Yongin-si (KR); Dong-Won Park, Hwaseong-si (KR); Jae Sung Bae, Suwon-si (KR)

(73) Assignee: Samsung Display Co., Ltd. (KR)

( * ) Notice: Subject to any disclaimer, the term of this patent is extended or adjusted under 35 U.S.C. 154(b) by 352 days.

(21) Appl. No.: 13/672,434

(22) Filed: Nov. 8, 2012

(65) Prior Publication Data

US 2013/0135257 A1    May 30, 2013

(30) Foreign Application Priority Data

Nov. 24, 2011  (KR) .................. 10-2011-0123579

(51) Int. Cl.
 G09G 3/36  (2006.01)
 G06F 3/042  (2006.01)
 G06F 3/041  (2006.01)

(52) U.S. Cl.
 CPC ............. *G06F 3/042* (2013.01); *G06F 3/0412* (2013.01); *G06F 2203/04104* (2013.01); *G06F 2203/04106* (2013.01)

(58) Field of Classification Search
 CPC .............................................. G09G 2300/0223
 See application file for complete search history.

(56) References Cited

U.S. PATENT DOCUMENTS

| | | | |
|---|---|---|---|
| 7,123,234 B2 | 10/2006 | Moon et al. | |
| 2003/0117356 A1* | 6/2003 | Moon | G02F 1/13452 345/87 |
| 2003/0117566 A1* | 6/2003 | Park | 349/149 |
| 2005/0083474 A1* | 4/2005 | Park | 349/151 |
| 2008/0278214 A1 | 11/2008 | Yoon et al. | |
| 2010/0001973 A1 | 1/2010 | Hotelling et al. | |
| 2011/0018893 A1* | 1/2011 | Kim et al. | 345/589 |
| 2011/0074743 A1 | 3/2011 | Son et al. | |
| 2011/0115724 A1* | 5/2011 | Jeon et al. | 345/173 |

FOREIGN PATENT DOCUMENTS

| | | |
|---|---|---|
| JP | 2005-031332 | 2/2005 |
| JP | 4378405 | 9/2009 |
| KR | 1019990023413 | 3/1999 |
| KR | 100904264 | 6/2004 |
| KR | 1020080003036 | 1/2008 |
| KR | 1020080003199 | 1/2008 |
| KR | 1020080051238 | 6/2008 |
| KR | 1020100005302 | 1/2010 |
| KR | 10201000062717 | 6/2010 |
| KR | 1020100074369 | 7/2010 |
| KR | 1020110049975 | 5/2011 |

\* cited by examiner

*Primary Examiner* — Sanghyuk Park
(74) *Attorney, Agent, or Firm* — Innovation Counsel LLP

(57) ABSTRACT

A display device includes: a first display panel; a second display panel facing the first display panel and including an optical sensor; an electro-optical active layer positioned between the first display panel and the second display panel; and a sensing gate driver including a first sensing gate driver and a second sensing gate driver, the sensing gate driver configured to transmit a sensing gate signal to the optical sensor, in which a first sensing gate off voltage applied to the first sensing gate driver is substantially the same as a second sensing gate off voltage applied to the second sensing gate driver.

11 Claims, 5 Drawing Sheets

DISPLAY DEVICE INCLUDING OPTICAL SENSOR

CROSS-REFERENCE TO RELATED APPLICATION

This application claims priority to and the benefit of Korean Patent Application No. 10-2011-0123579 filed in the Korean Intellectual Property Office on Nov. 24, 2011, the entire contents of which are incorporated herein by reference.

BACKGROUND OF THE INVENTION (a) Field of the Invention

A display device including an optical sensor is provided.

(b) Description of the Related Art

A flat panel display such as a liquid crystal display (LCD), an organic light emitting diode display (OLED display), and an electrophoretic display includes a plurality of pairs of field generating electrodes and electro-optical active layers interposed therebetween. The liquid crystal display includes a liquid crystal layer as the electro-optical active layer, and the organic light emitting diode display includes an organic emission layer as the electro-optical active layer. One of a pair of field generating electrodes is generally connected to a switching element to receive an electric signal, and the electro-optical active layer converts the electric signal into an optical signal to display an image.

Recently, the display device may include a touch sensing function capable of interacting with a user in addition to a function of displaying an image. The touch sensing function is to determine whether fingers of the user and the like are in contact with a screen and contact position information thereof by sensing changes of pressure applied to the screen by the display device, light, and the like when the user writes a text or draws a figure by contacting a finger or a touch pen on the screen. For example, in order to implement the touch sensing function, an infrared light sensing transistor may be used.

Further, the display device may include an image sensing function. The image sensing function is to recognize images such as a photograph, a barcode, and the like. For example, in order to implement the image sensing function, a visible light sensing transistor may be used.

The display device including the optical sensor includes a gate driver and a data driver for displaying an image, and a sensing gate driver and a sensing data driver for driving the optical sensor.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment may reduce a deviation of sensing gate off voltage applied to a sensing gate driver.

An exemplary embodiment provides a display device, including: a first display panel; a second display panel facing the first display panel and including an optical sensor; an electro-optical active layer positioned between the first display panel and the second display panel; and a sensing gate driver including a first sensing gate driver and a second sensing gate driver, the sensing gate driver configured to transmit a sensing gate signal to the optical sensor, in which a first sensing gate off voltage applied to the first sensing gate driver is substantially the same as a second sensing gate off voltage applied to the second sensing gate driver A sum of resistance values from a voltage supply unit to the first sensing gate driver is substantially the same as a sum of resistance values from a voltage supply unit to the second sensing gate driver.

The sensing gate driver may include a third sensing gate driver, and a third sensing gate-off voltage applied to the second sensing gate driver may be substantially the same as a fourth sensing gate-off voltage applied to the third sensing gate driver.

The sensing gate driver may include a third sensing gate driver, and a third sensing gate-off voltage applied to the third sensing gate driver may be substantially the same as the second sensing gate-off voltage applied to the second sensing gate driver.

A sum of resistance values from a voltage supply unit to the second sensing gate driver may be substantially the same as a sum of resistance values from the voltage supply unit to the third sensing gate.

The first sensing gate driver may be the first to receive a sensing gate-off voltage from the sensing gate driver.

The optical sensor may include a visible light sensor.

The visible light sensor may include a visible light sensing transistor and a first capacitor connected to the visible light sensing transistor.

The optical sensor may include an infrared light sensor.

The infrared light sensor may include an infrared light sensing transistor and a second capacitor connected to the infrared light sensing transistor.

An exemplary embodiment provides a display device, including: a first display panel; a second display panel facing the first display panel and including an optical sensor; an electro-optical active layer positioned between the first display panel and the second display panel; and a sensing gate driver including a first sensing gate driver and a second sensing gate driver, the sensing gate driver configured to transmit a sensing gate signal to the optical sensor, in which the second display panel includes a first contact member to which sensing gate-off voltage is applied, a second contact member connected to the first contact member through a first resistance and a second resistance which are connected to each other in series, and a third contact member and a fourth contact member connected to each other through a third resistance and a fourth resistance which are connected to each other in series, the third contact member is connected to the first sensing gate driver, and the fourth contact member is connected to the second sensing gate driver, and the first resistance, the second resistance, the third resistance and the fourth resistance may share a same node.

A value of the first resistance and a value of the second resistance may be substantially the same as each other, and a value of the third resistance and a value of the fourth resistance may be substantially the same as each other.

The sensing gate driver may include a third sensing gate driver, the second display panel may include a fifth contact member connected to a fifth resistance, the fifth contact member configured to receive a voltage from the second sensing gate driver, and a sixth contact member and a seventh contact member connected to each other through a sixth resistance and a seventh resistance which are connected to each other in series, the sixth contact member may be connected to the second sensing gate driver, and the seventh contact member may be connected to the third sensing gate driver, and the fifth resistance, the sixth resistance, and the seventh resistance may share a same node.

A value of the sixth resistance and a value of the seventh resistance may be substantially the same as each other.

The display device may satisfy Equation 4.

$$Rb=Ra+Rc+Rd+Rf+2Rcnt \quad \text{[Equation 4]}$$

In Equation 4, Ra is the first resistance, Rb is the third resistance, Rc is the fifth resistance, Rd is the sixth resistance and Rf is a resistance of the second sensing gate driver and Rcnt is a contact resistance.

DETAILED DESCRIPTION OF THE EMBODIMENTS

Figure 1:
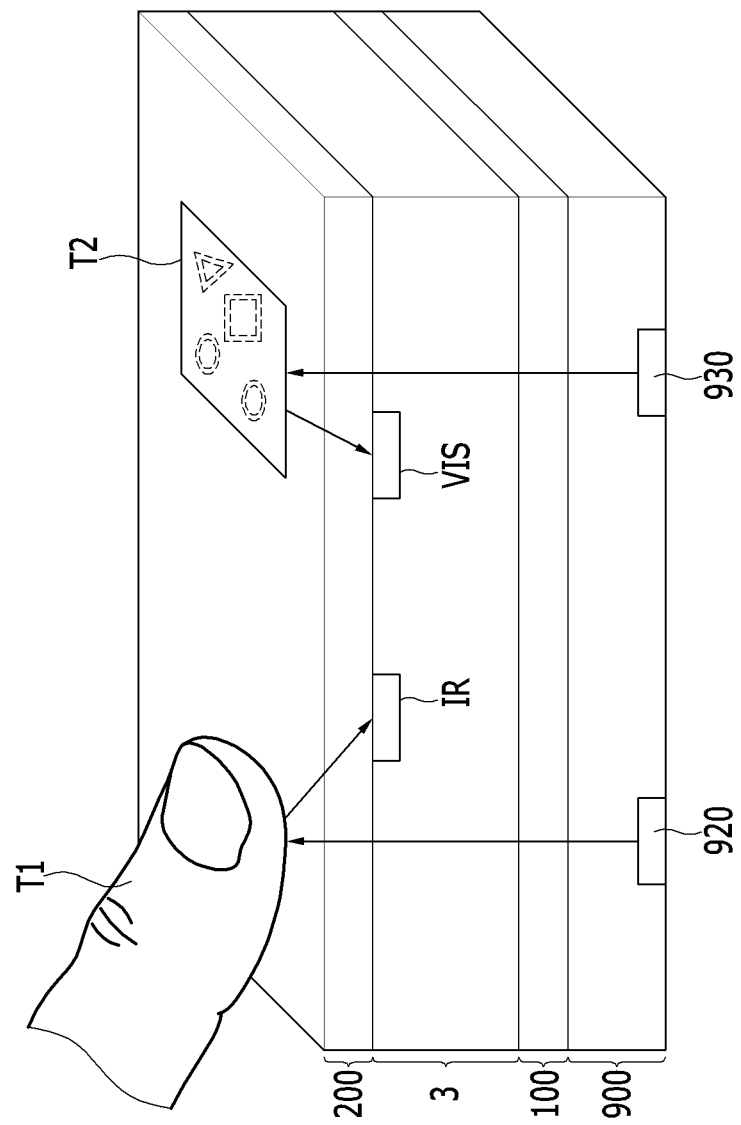
FIG. 1 is a schematic diagram of a display device including an optical sensor according to an exemplary embodiment.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In order to elucidate the present invention, parts that are not related to the description will be omitted. Like reference numerals designate like elements throughout the specification. Further, a detailed description of the related art that has been widely known is omitted.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present. On the contrary, it will be understood that when an element such as a layer, film, region, or substrate is referred to as being "beneath" another element, it may be directly under the other element or intervening elements may also be present. In contrast, when an element is referred to as being "directly beneath" another element, there are no intervening elements present.

Then, a display device including an optical sensor according to an exemplary embodiment will be described in detail with reference to FIGS. 1 to 5.

Figure 2:
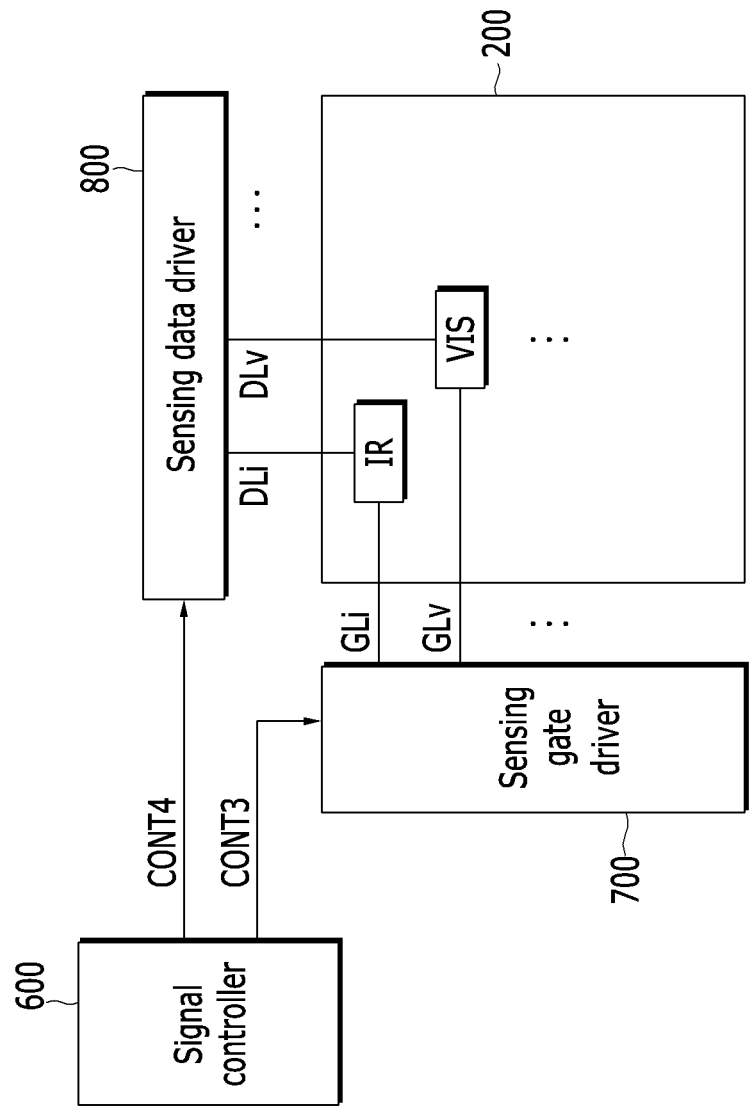
FIG. 2 is a schematic diagram of a display device including an optical sensor according to the exemplary embodiment.
Figure 3:
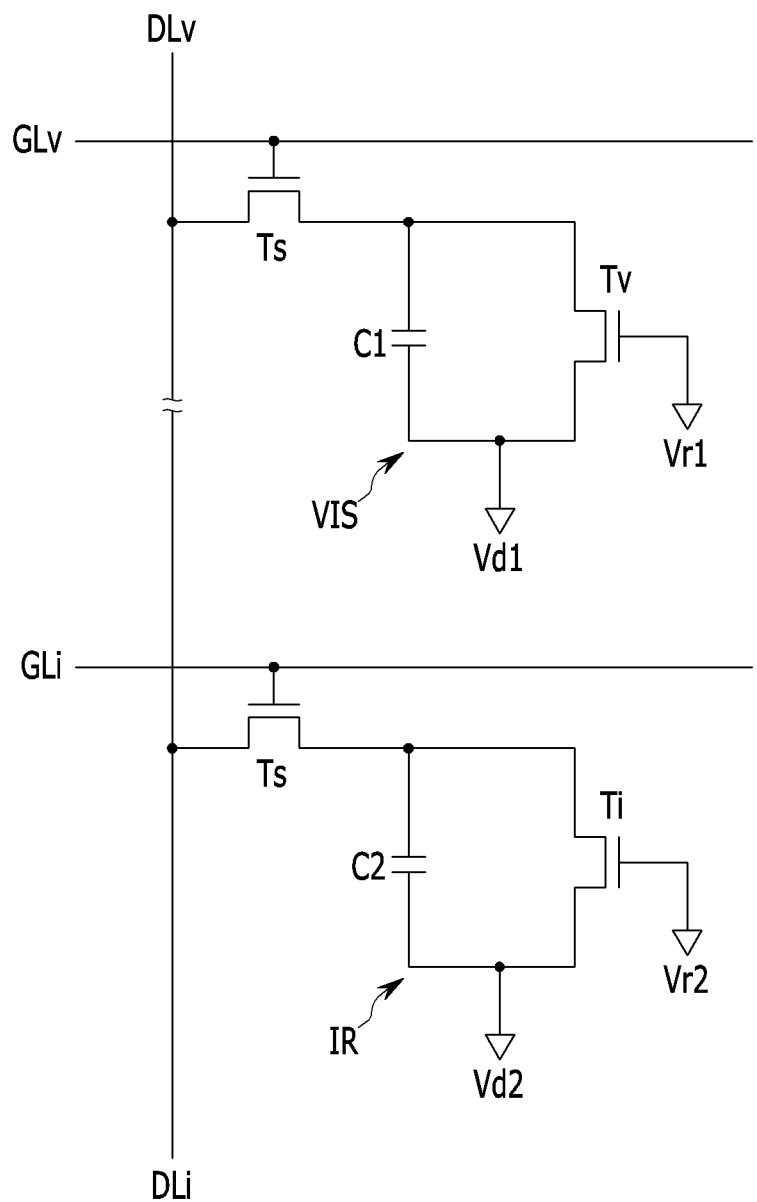
FIG. 3 is an equivalent circuit diagram of an optical sensor according to the exemplary embodiment.
Figure 4:
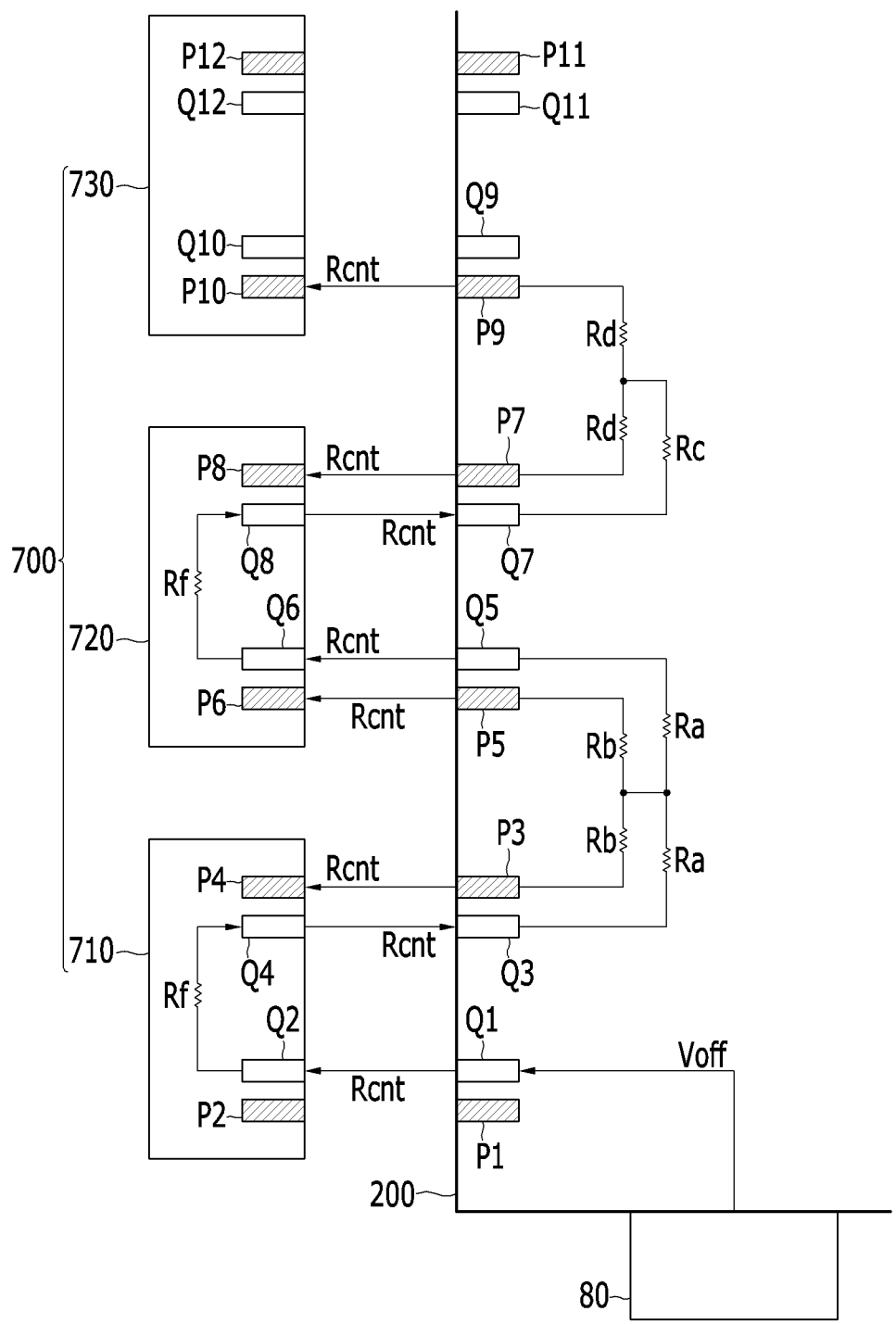
FIG. 4 is a diagram illustrating a connection relationship between a sensing gate driver and a display panel according to the exemplary embodiment.
Figure 5:
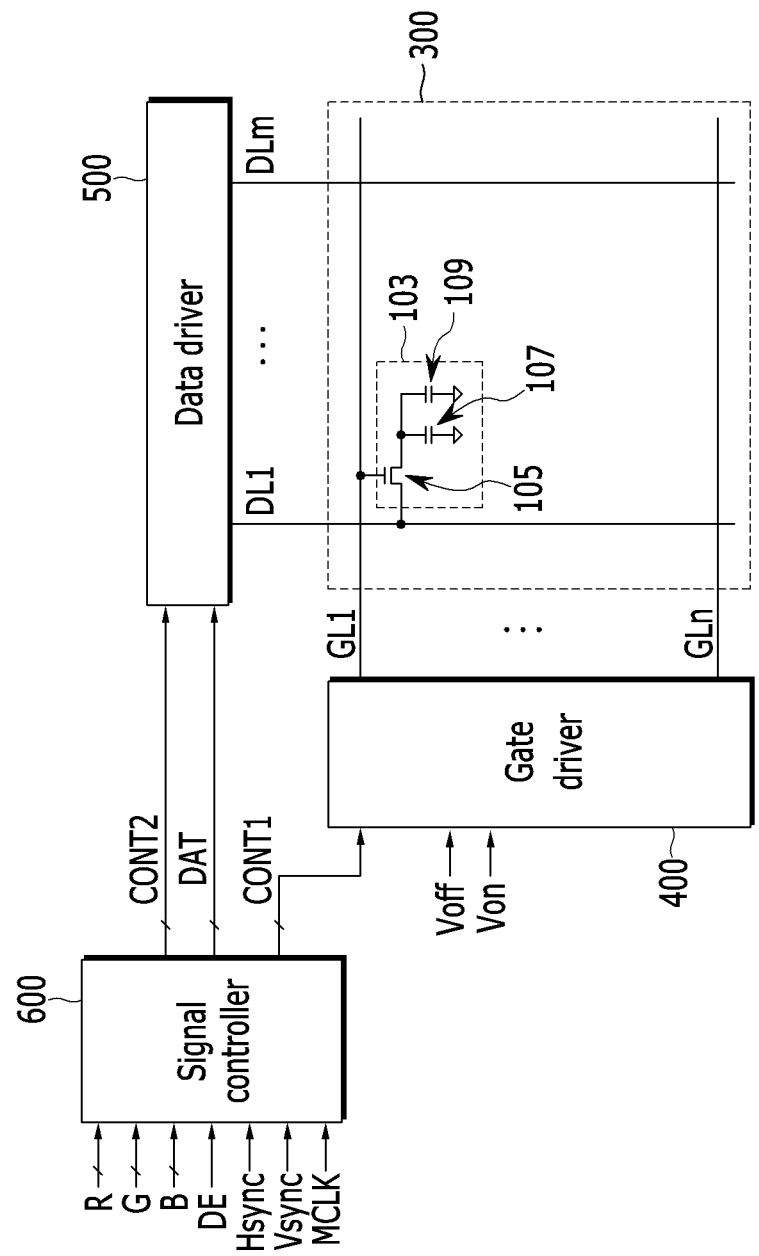
FIG. 5 is a schematic diagram of a liquid crystal display according to the exemplary embodiment.

FIG. 1 is a schematic diagram of a display device including an optical sensor according to an exemplary embodiment, FIG. 2 is a schematic diagram of a display device including an optical sensor according to the exemplary embodiment, FIG. 3 is an equivalent circuit diagram of an optical sensor according to the exemplary embodiment, FIG. 4 is a diagram illustrating a connection relationship between a sensing gate driver and a display panel according to the exemplary embodiment, and FIG. 5 is a schematic diagram of a liquid crystal display according to the exemplary embodiment.

Referring to FIG. 1, the display device includes a first display panel 100 and a second display panel 200 which face each other, and an electro-optical active layer 3 positioned between the first display panel 100 and the second display panel 200. The display device may include a liquid crystal display, an organic light emitting display, an electrophoretic display, a plasma display device, and the like. The electro-optical active layer 3 may include a liquid crystal layer, an organic emission layer, and the like.

The first display panel 100 may include a gate line, a data line, and a pixel including a thin film transistor connected thereto, and a plurality of pixels displays an image.

The second display panel 200 includes an optical sensor, and the optical sensor includes a visible light sensor VIS and an infrared light sensor IR. The visible light sensor VIS senses visible light reflected from images such as a photograph and a barcode to recognize the images. The infrared light sensor IR senses infrared light reflected from a touch such as a finger to recognize the touch. The optical sensor may be integrated on the second display panel 200. On a plan view of the second display panel 200, a plurality of visible light sensors (VIS) may be positioned in vertical and horizontal directions of the infrared light sensor IR, and a plurality of infrared light sensors (IR) may be positioned in vertical and horizontal directions of the visible light sensor VIS. Further, on a plan view of the second display panel 200, the plurality of visible light sensors VIS may be positioned to be adjacent to each other in a column direction, and the plurality of infrared light sensors IR may be positioned to be adjacent to each other in a column direction. In addition, the visible light sensors VIS and infrared light sensors IR may be arranged in various methods.

The display device includes a light source unit 900 positioned below the first display panel 100. The light source unit 900 may include at least one infrared light emitting unit 920 and at least one visible light emitting unit 930. The infrared light emitting unit 920 and the visible light emitting unit 930 may be dot light sources such as a light emitting diode. The infrared light and the visible light which are emitted from the infrared light emitting unit 920 and the visible light emitting unit 930 may be incident to be substantially vertical to the first display panel 100. The infrared light emitting unit 920 and the visible light emitting unit 930 may be uniformly distributed in the light source unit 900 so that the infrared light and the visible light may be supplied from most of surfaces of the light source unit 900. For example, the infrared light emitting unit 920 and the visible light emitting unit 930 may be alternately arranged, may be randomly arranged, or may be arranged with a predetermined ratio and configuration.

The infrared light and the visible light are generated from the light source unit 900. The infrared light sequentially passes through the first display panel 100, the electro-optical active layer 3, and the second display panel 200. The visible light sequentially passes through the first display panel 100, the electro-optical active layer 3, and the second display panel 200.

The infrared light supplied from the light source unit 900 may be used for touch-sensing of a first object T1 which is positioned on the display device. In the case where the first object T1 is adjacent to the display device, the infrared light emitted from the display device is reflected in the first object T1. The reflected infrared light is incident into the infrared light sensor IR and sensed by the infrared light sensor IR positioned on the second display panel 200. Accordingly, when touch occurs, contact information such as a position, a shape, and a size of the first object T1 may be acquired.

In the case where a gray of the visible light emitted from the display device is brighter than a gray of the visible light incident in the display device from the outside, the visible light emitted from the display device may be used when an image for a second object T2 adjacent to the display device is sensed. For example, the visible light emitted from the liquid crystal display is reflected in the second object T2. Reflected visible light is incident into the visible light sensor VIS and sensed in the visible light sensor VIS which is disposed on the second display panel 200. Accordingly, the image for the second object T2 is sensed and thus image information such as a shape, a size, and a color of the second object T2 may be acquired.

Referring to FIGS. 2 and 3, a signal controller 600 transmits a sensing gate control signal CONT3 and a sensing data control signal CONT4 to a sensing gate driver 700 and a sensing data driver 800, respectively, and the sensing gate driver 700 and the sensing data driver 800 transmit a sensing gate signal and a sensing data signal to an optical sensor, respectively. The sensing gate driver 700 is connected to the infrared light sensor IR and the visible light sensor VIS through an infrared light sensing gate line GLi and a visible light sensing gate line GLv, respectively. The sensing data driver 800 is connected to the infrared light sensor IR and the visible light sensor VIS through an infrared light sensing data line DLi and a visible light sensing data line DLv, respectively. The sensing gate driver 700 and the sensing data driver 800 may include at least one integrated chip, respectively, and may also be integrated on the second display panel 200.

The visible light sensor VIS includes a visible light sensing transistor Tv. Further, the visible light sensor VIS may include a first capacitor C1.

An input terminal of the visible light sensing transistor Tv is connected to driving voltage Vd1, an output terminal of the visible light sensing transistor Tv is connected to an input terminal of the switching transistor Ts, and a control terminal of the visible light sensing transistor Tv is connected to reference voltage Vr1.

An input terminal of the switching transistor Ts is connected to the output terminal of the visible light sensing transistor Tv, an output terminal of the switching transistor Ts is connected to the visible light sensing data line DLv, and a control terminal of the switching transistor Ts is connected to the visible light sensing gate line GLv.

Both terminals of the first capacitor C1 are connected to the input terminal and the output terminal of the visible light sensing transistor Tv, respectively.

The infrared light sensor IR includes an infrared light sensing transistor Ti. Further, the infrared light sensor IR may include a second capacitor C2.

An input terminal of the infrared light sensing transistor Ti is connected to driving voltage Vd2, an output terminal of the infrared light sensing transistor Ti is connected to an input terminal of the switching transistor Ts, and a control terminal of the infrared light sensing transistor Ti is connected to reference voltage Vr2.

An input terminal of the switching transistor Ts is connected to the output terminal of the infrared light sensing transistor Ti, an output terminal of the switching transistor Ts is connected to the infrared light sensing data line DLi, and a control terminal of the switching transistor Ts is connected to the infrared light sensing gate line GLi.

Both terminals of the second capacitor C2 are connected to the input terminal and the output terminal of the infrared light sensing transistor Ti, respectively.

The visible light sensing gate line GLv and the infrared light sensing gate line GLi may be formed of a common wiring, or may also be formed of an independent wiring. The visible light sensing data line DLv and the infrared light sensing data line DLi may be formed of a common wiring, or may also be formed of an independent wiring. The driving voltages Vd1 and Vd2 which are applied to the visible light sensing transistor Tv and the infrared light sensing transistor Ti, respectively may be applied through the independent wiring or may also be applied through the common wiring. The reference voltages Vr1 and Vr2 which are applied to the visible light sensing transistor Tv and the infrared light sensing transistor Ti, respectively may be applied through the independent wiring or may also be applied through the common wiring.

Referring to FIG. 4, the sensing gate driver 700 includes a first sensing gate driver 710, a second sensing gate driver 720 and a third sensing gate driver 730. The sensing gate driver 700 receives sensing gate-off voltage Voff from a voltage supply unit 80. The sensing gate driver 700 and the second display panel 200 are connected with each other through a plurality of contact members P1-P12 and Q1-Q12, and the sensing gate-off voltage Voff is applied to the first sensing gate driver 710, the second sensing gate driver 720 and the third sensing gate driver 730 through the contact members P1-P12 and Q1-Q12.

A terminal receiving the sensing gate-off voltage Voff for the first sensing gate driver 710 is P4, terminals receiving the sensing gate-off voltage Voff for the second sensing gate driver 720 are P6 and P8, and a terminal receiving the sensing gate-off voltage Voff for the third sensing gate driver 730 is P10. Here, the sensing gate-off voltages Voff applied to P4 and P6 are substantially the same as each other, and this is because each sensing gate-off voltage Voff is applied to P4 and P6 from the voltage supply unit 80 via substantially the same resistance. Since substantially the same sensing gate-off voltage Voff is applied to the first sensing gate driver 710 and the second sensing gate driver 720, a uniform sensing image may be obtained throughout the image.

On the contrary, in the case where different sensing gate-off voltages Voff are applied to the first sensing gate driver 710 and the second sensing gate driver 720, a non-uniform sensing image may be obtained between the sensing image connected to the first sensing gate driver 710 and the sensing image connected to the second sensing gate driver 720. This is because different sensing image may be occurred due to a minute difference in sensing gate off voltage in the display device including the optical sensor.

A path of the sensing gate off voltage from the voltage supply unit 80 to P4 and P6 will be described in detail. The sensing gate-off voltage Voff from the voltage supply unit 80 is applied to Q2 through Q1. A contact resistance Rcnt exists between Q1 and Q2. The sensing gate-off voltage Voff applied to Q2 of the first sensing gate driver 710 is transferred to Q3 of the second display panel 200 through Q4. An internal resistance Rf of the first sensing gate driver 710 exists between Q2 and Q4, and the contact resistance Rcnt exists between Q4 and Q3. The sensing gate-off voltage Voff applied to Q3 is simultaneously applied to P3 and P5 through a resistance Ra and a resistance Rb. Substantially the same sensing gate-off voltages Voff are applied to P3 and P5. The contact resistances Rcnt exist between P3 and P4 and between P5 and P6, respectively.

The sensing gate-off voltages Voff applied to P8 of the second sensing gate driver 720 and P10 of the third sensing gate driver 730 are substantially the same as each other because each sensing gate-off voltage Voff is applied to P8 and P10 via substantially the same resistance from the voltage supply unit 80. Since substantially the same sensing gate-off voltage Voff is applied to the second sensing gate driver 720 and the third sensing gate driver 730, the uniform sensing image may be obtained throughout the image.

A path of the sensing gate-off voltages Voff from the voltage supply unit 80 to the node P8 and P10 will be described in detail. The sensing gate-off voltage Voff sequentially passes through Q1, Q2, Q4, Q3, Q5, Q6, Q8 and Q7 from the voltage supply unit 80. Next, the sensing gate-off voltages Voff are simultaneously applied to P7 and P9 via a resistance Rc and a resistance Rd. Substantially the same sensing gate-off voltages Voff is applied to P8 and P10 via P7 and P9 respectively.

Since the sensing gate-off voltages Voff are applied to the second sensing gate driver 720 through P6 and P8, respectively, a sum of resistance values from the voltage supply unit 80 to P6 and P8 is substantially the same. As a result, the following Equation 1 is satisfied.

$$Rt(P6)=Rt(P8) \quad \text{[Equation 1]}$$

Resistances between the voltage supply unit 80 and P6 are Rcnt, Rf, Rcnt, Ra, Rb and Rcnt in sequence, and a sum of the resistance values is represented by the following Equation 2.

$$Rt(P6)=Ra+Rb+Rf+3Rcnt \quad \text{[Equation 2]}$$

Resistances between the voltage supply unit 80 and P8 are Rcnt, Rf, Rcnt, Ra, Ra, Rcnt, Rf, Rcnt, Rc, Rd and Rcnt in sequence, and a sum of the resistance values is represented by the following Equation 3.

$$Rt(P8)=2Ra+Rc+Rd+2Rf+5Rcnt \quad \text{[Equation 3]}$$

Thus, the following Equation 4 is obtained.

$$Rb=Ra+Rc+Rd+Rf+2Rcnt \quad \text{[Equation 4]}$$

Here, Rcnt has a negligible value in Equation 4, and thus, Rcnt may be omitted. When resistances are designed to satisfy the above Equation 4 by controlling at least one resistance value of Ra, Rb, Rc, Rd, or Rf, substantially the same sensing gate-off voltage Voff may be applied to P6 and P8.

FIG. 5 is schematic diagram of a liquid crystal display according to the exemplary embodiment. The liquid crystal display changes an alignment direction of a liquid crystal by an electric field generated between two electrodes and thus controls a transmitting amount of light to display an image. Referring to FIG. 5, the first display panel 100 may include gate lines GL1-GLn, data lines DL1-DLm, and a thin film transistor 105 connected thereto. The thin film transistor 105 controls voltages applied to a pixel 103 according to signals applied to the gate lines GL1-GLn and the data lines DL1-DLm. The pixel 103 may further include a storage capacitor 107. The storage capacitor 107 allows the voltage applied to the pixel 103 to be maintained for a predetermined time. For example, one pixel 103 may include a thin film transistor 105, storage capacitor 107 and a liquid crystal capacitor 109. The second display panel 200 facing the first display panel 100 may include a black matrix, a color filter and a common electrode. Common voltage Vcom is applied to the common electrode. In addition, at least one of the color filter, the black matrix, or the common electrode formed on the second display panel 200 may be formed on the first display panel 100. In the case where both a common electrode and a pixel electrode are formed on the first display panel 100, at least one of the common electrode or the pixel electrode may be formed in a linear electrode form. A liquid crystal layer may include a TN mode liquid crystal, a VA mode liquid crystal, an ECB mode liquid crystal, and the like. Polarizers may be attached to the outer surface of the second display panel 200 and the outer surface of the first display panel 100, respectively.

A liquid crystal panel assembly 300 includes a plurality of pixels. The plurality of pixels PX is connected to a plurality of signal lines. The signal lines include a plurality of gate lines GL1-GLn transferring gate signals (referred to as "scanning signals") and a plurality of data lines DL1-DLm transferring data signals.

A gray voltage generator (not shown) generates two gray voltage sets (or reference gray voltage sets) which affects transmittance of the pixel. One set of the two sets has a positive value with respect to a common voltage Vcom, and the other set thereof has a negative value with respect to a common voltage.

The gate driver 400 is connected to the gate lines GL1-GLn of the liquid crystal panel assembly 300 and applies gate signals having gate-on voltage Von and gate-off voltage Voff to the gate lines GL1-GLn.

The data driver 500 is connected to the data lines DL1-DLm of the liquid crystal panel assembly 300 and a gray voltage generator (not shown). The data driver 500 selects gray voltages in the gray voltage generator and applies the selected gray voltage to the pixel as data voltages. However, in the case where the gray voltage generator supplies only a predetermined level of reference gray voltages, the data driver 500 divides the reference gray voltages to generate all level of gray voltages for the entire grays and select data signals among the divided gray voltages.

The signal controller 600 controls the gate driver 400, the data driver 500, the sensing gate driver 700, and the sensing data driver 800.

The drivers 400, 500, 600, 700, and 800 may be directly mounted on the liquid crystal panel assembly 300 as an integrated circuit, or may be mounted on a flexible printed circuit film (not shown) attached to the liquid crystal panel assembly 300 in a tape carrier package (TCP) form. Unlike this, the drivers 400, 500, 600, 700, and 800 may be integrated into the liquid crystal panel assembly 300 together with the signal lines and a thin film transistor switching element Q. Further, all the drivers 400, 500, 600, 700, and 800 may be integrated into a single chip, and in this case, at least one of the drivers or at least one circuit element of the drivers may be disposed outside the single chip.

The signal controller 600 receives input image signals R, G and B from an external graphic controller (not shown) and an input control signal controlling a display thereof. The input image signals R, G and B have luminance information of each pixel PX, and the luminance has a predetermined number, for example, 1024 ($=2^{10}$), 256 ($=2^8$) or 64 ($=2^6$) of grays. Examples of the input control signal include a vertical synchronization signal Vsync, a horizontal synchronizing signal Hsync, a main clock MCLK, a data enable signal DE, and the like.

The signal controller 600 properly processes the input image signals R, G and B according to an operation condition of the liquid crystal panel assembly 300 and the data driver 500 on the basis of the input image signals R, G and B and the input control signal. The signal controller 600 generates a gate control signal CONT1 and a data control signal CONT2, a sensing gate control signal CONT3, a sensing data control signal CONT4, and the like. The signal controller 600 transmits the gate control signal CONT1 to the gate driver 400, transmits the data control signal CONT2 and the processed image signal DAT to the data driver 500, transmits the sensing gate control signal CONT3 to the sensing gate driver 700, and transmits the sensing data control signal CONT4 to the sensing data driver 800. The output image signal DAT has a predetermined number of values (or grays) as a digital signal.

The gate control signal CONT1 includes a scanning start signal STV instructing a scanning start and at least one clock signal controlling an output period of the gate-on voltage Von. The gate control signal CONT1 may further include an output enable signal OE limiting a duration time of the gate-on voltage Von.

The data control signal CONT2 includes a horizontal synchronization start signal STH notifying a transmission start of the image data for the pixels in one row and a load signal LOAD and a data clock signal HCLK which apply the data signal to the data lines D1-Dm. The data control signal CONT2 may further include an inversion signal RVS inverting a voltage polarity of a data signal with respect to a common voltage Vcom.

According to the data control signal CONT2 from the signal controller 600, the data driver 500 receives the digital image signals DAT for the pixels PX for one row at a time and selects gray voltages corresponding to each digital image signals DAT to convert the digital image signals DAT into analog data signals and then apply the converted analog data signals to the data lines D1-Dm. The number of gray voltages generated by the gray voltage generator is the same as the number of grays represented by the digital image signals DAT.

The gate driver 400 applies the gate-on voltage Von to the gate lines G1-Gn according to the gate control signal CONT1 from the signal controller 600 to turn on the switching elements Q connected to the gate lines G1-Gn. Then, the data signals applied to the data lines D1-Dm are applied to the corresponding pixels PX through the turned-on switching elements Q.

Pixel voltage, a difference between the voltage of the data signal applied to the pixel PX and the common voltage Vcom, is represented as charged voltage of a liquid crystal capacitor CLC. An alignment of liquid crystal molecules varies according to a magnitude of the pixel voltage and polarization of light passing though the liquid crystal layer is changed according to the alignment of the liquid crystal molecules. The change in the polarization of the light affects a transmittance of light through a polarizer attached to the display panel assembly 300. Thus the pixel PX displays luminance represented by the gray of the image signal DAT.

By repeating the above process during a 1 horizontal period [also referred to as "1H" and being the same as one period of the horizontal synchronizing signal Hsync and the data enable signal DE], the gate-on voltages Von are sequentially applied to a plurality of gate lines and the data signals are applied to a plurality of pixels PX to display an image of one frame.

In a frame inversion scheme, the inversion signals RVS having opposite polarity to the previous frame are applied to pixels PX during the present frame. The polarity of the data signal may be changed differently according to an inversion scheme of the panel such as a row inversion, a dot inversion a column inversion and the like.

An exemplary embodiment may reduce a deviation of sensing gate off voltage applied to a sensing gate driver.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a first display panel including a thin film transistor;
a second display panel facing the first display panel and including an optical sensor;
an electro-optical active layer positioned between the first display panel and the second display panel; and
a sensing gate driver including a first sensing gate driver, a second sensing gate driver and a third sensing gate driver disposed on the second display panel, the sensing gate driver configured to transmit a sensing gate signal to the optical sensor,
wherein a first sensing gate off voltage applied to the first sensing gate driver is substantially same as a second sensing gate off voltage applied to the second sensing gate driver,
the first sensing gate off voltage and the second sensing gate off voltage are applied to the first sensing gate driver and the second gate sensing driver via substantially same resistance,
the second display panel includes a first resistance, the first resistance being a half of a resistance of a first gate off voltage bypass line connected between the first sensing gate driver and the second sensing gate driver, a second resistance, the second resistance being a half of a resistance of a first gate off voltage apply line connected between the first sensing gate driver and the second sensing gate driver, a third resistance, the third resistance being a resistance of a second gate off voltage bypass line connected between the second sensing gate driver and the third sensing gate driver, and a fourth resistance, the fourth resistance being a half of a resistance of a third gate off voltage apply line connected between the second sensing gate driver and the third sensing gate driver,
each of the second sensing gate driver and the third sensing gate driver includes an internal resistance, and
the second resistance is substantially the same as a sum of the first resistance, the third resistance, the fourth resistance, and the internal resistance.

2. The display device of claim 1, wherein:
a sum of resistance values from a voltage supply unit to the first sensing gate driver is substantially same as a sum of resistance values from a voltage supply unit to the second sensing gate driver.

3. The display device of claim 2, wherein:
a third sensing gate-off voltage applied to the second sensing gate driver is substantially same as a fourth sensing gate-off voltage applied to the third sensing gate driver.

4. The display device of claim 1, wherein a third sensing gate-off voltage applied to the third sensing gate driver is substantially same as the second sensing gate-off voltage applied to the second sensing gate driver.

5. The display device of claim 4, wherein:
a sum of resistance values from a voltage supply unit to the second sensing gate driver is substantially same as a sum of resistance values from the voltage supply unit to the third sensing gate driver.

6. The display device of claim 1, wherein:
the first sensing gate driver is first to receive a sensing gate-off voltage from the sensing gate driver.

7. The display device of claim 6, wherein:
the optical sensor includes a visible light sensor.

8. The display device of claim 7, wherein:
the visible light sensor includes a visible light sensing transistor and a first capacitor connected to the visible light sensing transistor.

9. The display device of claim 6, wherein:
the optical sensor includes an infrared light sensor.

10. The display device of claim 9, wherein:
the infrared light sensor includes an infrared light sensing transistor and a second capacitor connected to the infrared light sensing transistor.

11. The display device of claim 1, further comprising,
a first gate-off voltage bypass line connecting the first sensing gate driver and the second sensing gate driver, and a second gate-off voltage bypass line connecting the second sensing gate driver and the third sensing gate driver, the first gate-off voltage bypass line having a resistance of twice of the first resistance and the second gate-off voltage bypass line having the third resistance,
a first gate-off voltage apply line connecting a center of the first gate-off bypass line and the first sensing gate driver, and having the second resistance,
a second gate-off voltage apply line connecting a center of the first gate-off bypass line and the second sensing gate driver, and having the second resistance,
a third gate-off voltage apply line connecting the second gate-off voltage bypass line and the second sensing gate drivers, and having the fourth resistance, and
a fourth gate-off voltage apply line connecting the second gate-off voltage bypass line and the third sensing gate drivers, and having the fourth resistance,
wherein the second resistance is substantially greater than a sum of the first resistance, the third resistance and the fourth resistance by more than the internal resistance of the second sensing gate driver.

* * * * *